United States Patent [19]

Weichel

[11] 4,162,606
[45] Jul. 31, 1979

[54] MOWER FOR MOUNTING ON THE FRONT END OF AN AGRICULTURAL VEHICLE

[76] Inventor: Ernst Weichel, Postfach 1180, 7326 Heiningen, Fed. Rep. of Germany

[21] Appl. No.: 847,548

[22] Filed: Nov. 1, 1977

[30] Foreign Application Priority Data

Nov. 19, 1976 [DE] Fed. Rep. of Germany ....... 2652736

[51] Int. Cl.² .............................................. A01D 35/14
[52] U.S. Cl. ....................................... 56/15.9; 56/228; 56/DIG. 10
[58] Field of Search ...................... 56/15.9, 15.8, 16.1, 56/16.3, 228, DIG. 10

[56] References Cited

U.S. PATENT DOCUMENTS

| | | | |
|---|---|---|---|
| 1,014,663 | 1/1912 | Mustin | 56/16.3 |
| 1,889,624 | 11/1932 | Atkinson | 56/16.3 |
| 2,337,307 | 12/1943 | Beck | 56/15.9 |
| 2,680,946 | 6/1954 | Rousey | 56/15.9 |
| 2,958,993 | 11/1960 | Slavens et al. | 56/15.9 |
| 3,857,225 | 12/1974 | Knudson | 56/15.9 |
| 3,959,957 | 6/1976 | Halls | 56/15.8 |
| 4,067,176 | 1/1978 | Hoch et al. | 56/15.9 |

FOREIGN PATENT DOCUMENTS 2122156 12/1971 Fed. Rep. of Germany ............ 56/15.9

Primary Examiner—Louis G. Mancene
Assistant Examiner—Paul J. Hirsch
Attorney, Agent, or Firm—Toren, McGeady and Stanger

[57] ABSTRACT

A mower for cutting grass, brush and the like includes a substantially U-shaped frame which is to be pivotally connected to the front end of a vehicle. The frame has a pair of arms with free ends extending in the direction of travel when the mower is in a cutting position. The frame is movable between the cutting position and a non-operating position during which the vehicle may be driven over roads without removing the mower. A rocker arm is pivotally connected to the free end of each of the arms of the U-shaped frame, and a cutter assembly, including cutter blades, is suspended from the U-shaped frame being pivotally connected between the rocker arms. The cutter assembly has a support shoe at each end to which the rocker arms are pivotally connected. The points of pivotal connection of each of the rocker arms to the free ends of the U-shaped frame are located in front (with respect to the directon of travel of the mower) of the connection of the rocker arms to the support shoes. A third rocker arm extends parallel to and behind one of the other rocker arms and is also pivotally connected at one end to one of the pair of arms of the U-shaped frame and at the other end to one of the support shoes of the cutter assembly to form a parallelogram linkage between the cutter assembly and the arms of the U-shaped frame.

5 Claims, 2 Drawing Figures

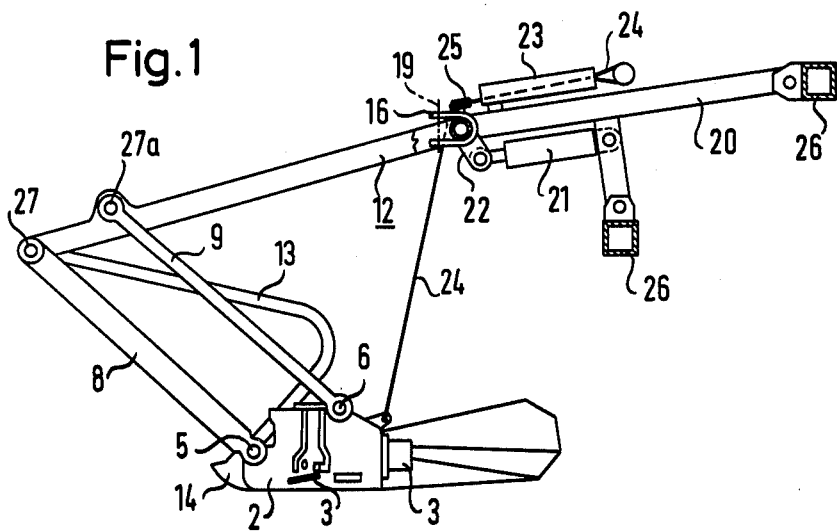
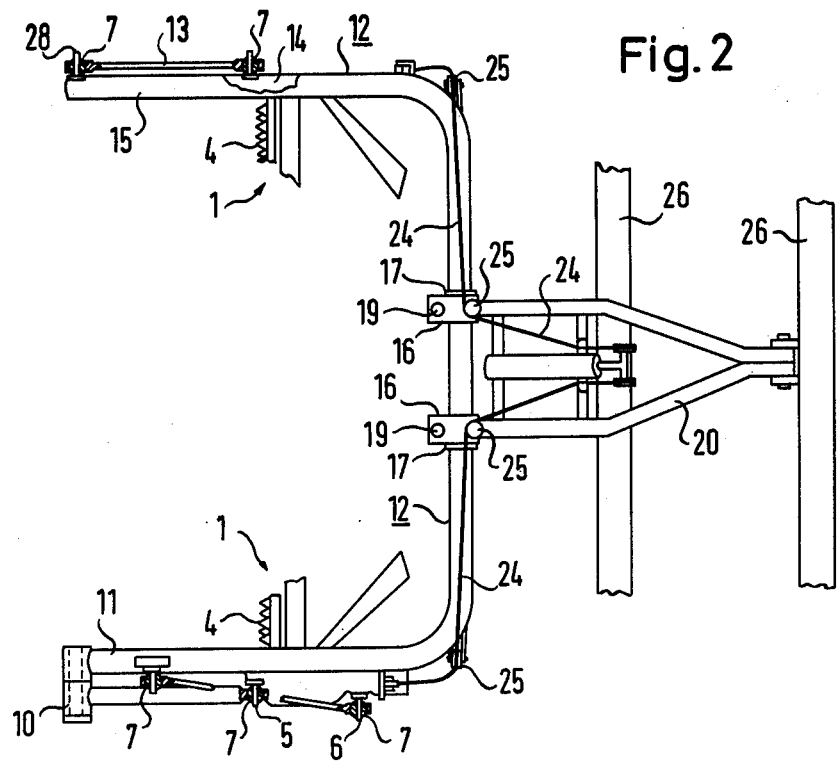

MOWER FOR MOUNTING ON THE FRONT END OF AN AGRICULTURAL VEHICLE

BACKGROUND OF THE INVENTION

The present invention relates generally to mowers for cutting grass, brush and the like, and more particularly to such mowers of the type intended to be mounted on the front end of a vehicle, such as a loading truck for picking up the material cut by the mower.

The use of mowers mounted on the front ends of vehicles are of advantage since the matter cut by the mower can be directly swept or picked up by the vehicle driving the mower. Such front mounted mowers are therefore preferably mounted on the front ends of vehicles such as loading trucks.

It is important to mount the mower on the front end of the vehicle in such a manner that it will easily ride over any uneven contour of the ground or any obstacle. Additionally, it has been found necessary to mount the mower on the front end of the vehicle in such a manner that it can be moved out of a cutting position and into a non-operating position to permit the vehicle to be driven over roads without creating the possibility of damage to the cutter assembly and to have the mower located in such a position that it will not present a visual obstacle to the driver of the vehicle. Known mowers of the type mounted on the front ends of vehicles have been found to be inadequate because they are either of a type which will not easily yield to obstacles encountered during the cutting operation, or cannot be easily moved to a non-operating position in which the cutter assembly is in a position to minimize possible damage, or they do not allow the driver of the vehicle to have an unobstructed view of the road.

The object of the invention is therefore to provide a mower of the type to be mounted on the front end of a vehicle having a support for the cutter assembly which permits the cutter assembly to ride safely over the ground and any obstacles encountered during the cutting operation to avoid possible damage to the cutter blades.

The mower must also be able to move from a cutting position to a non-operating position in which the cutter assembly is relatively safe from road hazards while the vehicle is being driven over a road and in which the driver of the vehicle has an unobstructed view of the road.

SUMMARY OF THE INVENTION

The foregoing objects are accomplished by providing a mower of the type to be mounted on the front end of a vehicle which comprises a substantially U-shaped frame having first and second arms with free ends extending in the direction of travel when the mower is in the cutting position. Means are provided for connecting the U-shaped frame to the front end of the vehicle for pivotal movement about an axis transverse to the direction of travel to move the frame between a substantial vertical non-operating position with the free ends of the frame extending in a general upward direction, and an operating or cutting position in which the free ends of the frame extend in the direction of travel. First and second rocker arms are pivotally connected at one end to the free ends of the first and second arms of the U-shaped frame for pivotal movement about an axis extending generally transverse to the direction of travel of the mower. A cutter assembly including cutter blades is suspended from the U-shaped frame by being connected between the other ends of the first and second rocker arms. The point of pivotal connection of the first and second rocker arms with the free ends of the U-shaped frame is located in front (with respect to the direction of travel) of the point of connection of the cutter assembly to the other ends of the first and second rocker arms when the mower is in the position for cutting. A third rocker arm is positioned behind and parallel to the first rocker arm being connected at one end thereof to the first arm of the U-shaped frame and at the other end to the cutter assembly. In this manner, the first and third rocker arms form a parallelogram linkage between the arms of the U-shaped frame and the cutter assembly for supporting the cutter assembly in a manner to permit the assembly to ride over obstacles or contours in the ground while maintaining a general parallel relationship with the ground for constant cutting operation.

The parallelogram linkage permits the cutter assembly to remain parallel with the ground as it rides along the surface regardless of any unevenness or other obstacles encountered. Because the points of pivotal connection of the rocker arms to the U-shaped frame arms are located in front of the connection of the rocker arms to the cutter assembly, with respect to the direction of travel, the cutter assembly will be free to ride over obstacles encountered during the cutting operation without causing damage to the cutter blades. The U-shaped frame can be swung about its pivotal connection to the vehicle into a substantial vertical position. The parallelogram linkage for supporting the cutter assembly will also therefore cause the cutter assembly to be in a substantial vertical position to minimize the possibility of encountering road hazards when the vehicle is being driven over a road. Additionally, because of the U-shaped frame structure, the driver of the vehicle will have an unimpaired view of the road through the arms of the U-shaped frame when it is in the vertical, non-operating position.

An embodiment of the invention will be more fully described with reference to the following drawings annexed hereto.

BRIEF DESCRIPTION OF THE DRAWINGS

In the drawings:

FIG. 1 is a schematic side elevational view of the mower to be mounted on the front end of a vehicle in accordance with the present invention; and FIG. 2 is a top plan view of the mower shown in FIG. 1 having parts thereof broken away for purposes of clearly illustrating other parts of the invention.

DESCRIPTION OF THE INVENTION

Referring now in more detail to the accompanying drawings, the mower of the present invention is shown in its operating position for cutting, and includes a double blade cutting assembly 1 with a pair of cooperating mower blades 4. A first supporting shoe 2 is carried on an end of the cutter assembly 1 positioned on the left side of the cutter assembly, when facing in the direction of travel (i.e. toward the left when viewing the drawings). A driving unit 3 is carried on the shoe 2 for driving the cooperating mower blades 4 to perform the cutting operation. Support shoe 2 carries front and rear bolts 5 and 6 respectively for connection will ball and socket joints 7 which are carried at one end of a pair of rocker arms 8 and 9 respectively which extend parallel to each other forming a parallelogram linkage. The other ends of rocker arms 8 and 9 are connected to an arm 11 of a U-shaped frame 12. Rocker arm 8 is connected to the free end of arm 11 at pivot point 27 for pivotal movement about an axis transverse to the direction of travel by a cylindrical trunnion bearing 10 which maintains the rocker arm 8 in a laterally stable position with respect to arm 11. Rocker arm 9 is pivotally connected to the arm 11 and pivot point 27a.

A second support shoe 14 is positioned on the opposite side (the right side) of the cutter assembly. Shoes 2 and 14 therefore serve for supporting the cutter assembly as it rides along the surface of the ground. A curved rocker arm 13 connects the support shoe 14 with the arm 15 of the U-shaped frame 12. Rocker arm 13 is pivotally connected to the free end of arm 15 at pivot point 28. The end of rocker arm 13 opposite its connection to arm 15 also carries a ball and socket joint 7 for connection with an appropriate coupling on support shoe 14.

It will be noted, particularly from FIG. 1, that the pivotal points of connection 27 and 27a for rocker arms 8 and 9 respectively to the arm 11 of the U-shaped frame 12, and pivot point 28 for connection of the rocker arm 13 to the arm 15 of the U-shaped frame 12, are positioned a significant distance in front of the ball and socket joints 7 connecting the rocker arms 8, 9 and 13 with the supporting shoes 2 and 14 respectively. Accordingly, the cutter assembly 1 is suspended from the U-shaped frame on the rocker arms in a trailing arrangement. As a result of this arrangement and the use of the parallelogram linkage formed by the rocker arms 8 and 9, the cutter assembly can ride along the surface of the ground being raised and lowered with the contour of the ground or over any obstacles while maintaining the cutter assembly in a substantial parallel relationship with the ground for continued cutting operation.

The ends of the arms 11 and 15 opposite their free ends are joined by a transverse connecting bar of the U-shaped frame. The U-shaped frame is preferably made with the arms 11 and 15 and the transverse connecting bar formed integrally from a round pipe. An intermediate bifurcated supporting frame 20 is connected at one end to the chassis or frame 26 of the front end of the a vehicle to which the mower is to be mounted. Each of the distal ends of the bifurcated arms of the supporting frame 20 carry open sockets 16 for receiving the transverse connecting bar of the U-shaped frame 12. Pins 19 are arranged at the open mouth of the sockets 16 for securely positioning the transverse connecting bar of the U-shaped frame 12 in the sockets. Rings 17 are carried on the transverse connecting bar to engage the sides of open sockets 16 to prevent axial movement of the transverse connecting bar through the open sockets. The end of the supporting frame 20 opposite the open sockets can be detachably connected to the chassis of the vehicle through the use of appropriate connecting pins or other connection means to allow pivotal movement of the supporting frame with respect to the vehicle. The U-shaped frame 12 is thus carried at the front end of the vehicle on supporting frame 20 in a manner to permit pivotal movement of the U-shaped frame between a substantially vertical position in which the free ends of the arms 11 and 15 extend in a generally upward direction for a non-operating or transporting condition of the mower, and a position in which the free ends of the arms 11 and 15 extend substantially in the direction of travel of the vehicle when the mower is in a cutting or operating position.

Supporting frame 20 carries a hydraulic motor 21 having its piston connected to one end of a lifting lever 22. The other end of the lifting lever 22 is connected with the transverse connecting bar of the U-shaped frame 12. Upon energization of the hydraulic motor 21 for extension or retraction of its piston the transverse connecting bar of the U-shaped frame 12 will be caused to rotate in the sockets 16. In this manner, the relative position of the arms 11 and 15 of the U-shaped frame 12 can be varied from the surface of the ground to achieve any desired operating height and the U-shaped frame can be moved between the operating and non-operating positions.

To lift the cutter assembly to a desired height from the ground into a cutting position, cables 24 are connected at one end to the support shoes 2 and 14, extend over guide rollers 25 mounted on the U-shaped frame 12, and are connected at their other end to a piston of another hydraulic motor 23 also carried on support frame 20. Energization of hydraulic motor 23 and extension of its piston will thus cause cables 24 to ride over the rollers 25 to vary the vertical distance between the cutter assembly and the arms of the O-shaped frame 12. Accordingly, the height of the cutter assembly 1 can be varied with respect to the surface of the ground without varying the height of the arms 11 and 15.

In order to lift the mower from its operating or cutting position to its non-operating or traveling position, hydraulic motor 21 will be actuated to extend its piston thus causing the transverse connecting bar of the U-shaped frame 12 to rotate within the sockets 16 in a clockwise direction (when viewing FIG. 1), thus causing arms 11 and 15 to move into a substantial vertical position. Because of the parallelogram linkage connection, cutter assembly 1 will also move into a substantial vertical position and will preferably be at about the same height as the bumper guard for the vehicle. The driver of the vehicle will be able to clearly see through the space between the arms 11 and 15 to have an unobstructed driving view. Additionally, since the cutter assembly is substantially vertical, the cutting blades 4 of the cutter assembly will not be exposed to road hazards while the vehile is being driven over the road and will be completely out of view from the driver so that he has a clear view of the road.

Even in the operating position of the mower, the driver of the vehicle will have an unobstructed view of the surface of the ground because he will be able to see through the space between the arms 11 and 15 of the U-shaped frame.

While the invention has been described and illustrated with respect to a certain preferred embodiment which produces satisfactory results, it will be appreciated by those skilled in the art after understanding the purposes of the invention, that various changes and modifications may be made without departing from the spirit and scope of the invention, and it is therefore intended to cover all such changes and modifications in the appended claims.

What is claimed is:

1. A mower for mounting on the front end of an agricultural vehicle comprising a substantially U-shaped frame having first and second arms with free ends extending in the direction of travel when the mower is in a cutting position, means pivotally connecting said frame to the front end of the vehicle for movement of said frame between a non-operating and the cutting position, first and second rocker arms pivotally connected at one end thereof to the free ends of said first and second arms respectively for pivotal movement about an axis transverse to the direction of travel of said mower, at least one cutter assembly having first and second support shoes at the ends thereof pivotally suspended from the other ends of said first and second rocker arms, said pivotal connection of said rocker arms to the free ends of said U-shaped frame arms being located in front of the pivotal connection of said support shoes to the other ends of said rocker arms with respect to the direction of travel when said mower is in the cutting position, and a third rocker arm extending parallel to and positioned behind said first rocker arm with respect to the direction of travel of said mower, said third rocker arm being pivotally connected to one end thereof to said first arm of said U-shaped frame and to said first support shoe of said cutter assembly at the other end thereof.

2. The mower according to claim 1 further comprising ball and socket joints pivotally carried by said first, second and third rocker arms for connecting said rocker arms to their respective support shoes, and a cylindrical trunnion bearing pivotally connecting one of said rocker arms to one of said arms of said U-shaped frame so that said rocker arm is laterally stable with respect to said arm of said U-shaped frame.

3. The mower according to claim 1 further comprising a hydraulic motor supported by said mower and a pair of cables connected between said hydraulic motor and said shoes of said cutter assembly, whereby upon actuation of said hydraulic motor the relative vertical position between said cutter assembly and said U-shaped frame may be varied to adjust the cutting height of the mower.

4. The mower according to claim 1 further comprising means for moving said U-shaped frame between an operating position in which the free ends of said arms are extended in the direction of travel of said mower and a non-operating position in which said arms are extended in a substantial vertical direction, said means comprising a hydraulic motor mounted on said mower, and lever means connected at one end thereof to the piston of said hydraulic motor and at the other end thereof to said U-shaped frame for causing pivotal movement of said U-shaped frame about an axis substantially transverse to the direction of travel of the mower when said hydraulic motor is actuated.

5. The mower according to claim 4 wherein said means pivotally connecting said U-shaped frame to said vehicle comprises an intermediate support frame pivotally connected at one end thereof to said vehicle, at least one open socket at the other end of said frame for pivotally supporting therein said U-shaped frame, and at least one ring mounted on said frame for bearing against said open socket to prevent axial movement of said U-shaped frame in said socket.

* * * * *